(12) United States Patent
Chang et al.

(10) Patent No.: US 10,023,360 B2
(45) Date of Patent: Jul. 17, 2018

(54) SEALING BAG FOR HYDROGEN GAS, AND METHOD FOR DISSOLVING HYDROGEN GAS

(71) Applicants: HIKARIMIRAI CO., LTD., Tokyo (JP); KYOWA CO., LTD., Fussa-shi, Tokyo (JP)

(72) Inventors: Wen Shih Chang, Tokyo (JP); Naoyuki Yada, Atsugi (JP)

(73) Assignees: Hirakimirai Co. Ltd., Tokyo (JP); Kyowa Co. Ltd., Tokyo (JP)

( * ) Notice: Subject to any disclaimer, the term of this patent is extended or adjusted under 35 U.S.C. 154(b) by 0 days.

(21) Appl. No.: 13/846,373

(22) Filed: Mar. 18, 2013

(65) Prior Publication Data
US 2014/0010483 A1    Jan. 9, 2014

(30) Foreign Application Priority Data

Jul. 6, 2012  (JP) ................. 2012-152735

(51) Int. Cl.
*B65D 33/01*    (2006.01)
*B65D 30/08*    (2006.01)
(Continued)

(52) U.S. Cl.
CPC ............ *B65D 31/02* (2013.01); *A23L 3/3445* (2013.01); *A23L 3/34095* (2013.01);
(Continued)

(58) Field of Classification Search
CPC .... B65D 33/01; B65D 31/02; B65D 75/5894; B65D 81/2076; B65D 81/24;
(Continued)

(56) References Cited

U.S. PATENT DOCUMENTS 3,389,783 A * 6/1968 Bjorkengren ................. 426/107
3,419,400 A * 12/1968 Hayhurst et al. ............. 426/124
(Continued)

FOREIGN PATENT DOCUMENTS

CN     1840487         10/2006
JP     61021782 A  *   1/1986   ............. C02F 1/688
(Continued)

OTHER PUBLICATIONS

Machine translation of the description of Japanese Document No. 2005-13925. Translated on Jul. 17, 2015.*
(Continued)

*Primary Examiner* — Jes F Pascua
(74) *Attorney, Agent, or Firm* — Chris Mizumoto; Foreign Law Office of Chris Mizumoto

(57) ABSTRACT

The present invention aims at dissolving hydrogen gas in a liquid and maintaining the solubility of the hydrogen gas in the liquid at a high state.

A sealing bag 1 that dissolves hydrogen gas in a liquid by being put into the liquid includes a hydrogen permeable film that can permeate hydrogen gas that is sealed and filled in the sealing bag to outside. By sinking this sealing bag 1 into the liquid in advance, the hydrogen gas that is permeated through the hydrogen permeable film is dissolved in the liquid. Furthermore, since the hydrogen gas is continuously permeated little by little through the hydrogen permeable film, the solubility of the hydrogen in the liquid can be maintained at a high state.

11 Claims, 9 Drawing Sheets

(51) Int. Cl.
  *A23L 3/3409* (2006.01)
  *A23L 3/3445* (2006.01)
  B65D 75/58 (2006.01)
  B65D 81/20 (2006.01)
  B65D 81/24 (2006.01)
  *B65B 31/00* (2006.01)
  *B65B 61/20* (2006.01)

(52) U.S. Cl.
  CPC ........ B65D 33/01 (2013.01); B65D 75/5894 (2013.01); B65D 81/2076 (2013.01); B65D 81/24 (2013.01); *B65B 31/00* (2013.01); *B65B 61/20* (2013.01); *B65B 2220/14* (2013.01); *B65D 2565/387* (2013.01); *B65D 2565/388* (2013.01); *B65D 2575/586* (2013.01); *Y02E 60/36* (2013.01); *Y02W 30/806* (2015.05)

(58) Field of Classification Search
  CPC ........ B65D 2565/387; B65D 2565/388; B65D 2575/586
  USPC ............. 383/109, 103, 111, 106, 66; 99/323
  See application file for complete search history.

(56) References Cited

U.S. PATENT DOCUMENTS

| | | | | |
|---|---|---|---|---|
| 4,657,610 A * | 4/1987 | Komatsu | ................. | B32B 27/10 156/252 |
| 5,157,902 A * | 10/1992 | Hatakeyama | ......... | A23L 3/3427 53/141 |
| 5,342,412 A * | 8/1994 | Ueki | ....................... | A61F 7/034 607/114 |
| 5,975,074 A * | 11/1999 | Koiso | ...................... | B32B 5/26 126/204 |
| 6,306,352 B1 * | 10/2001 | Yoshida | ................. | A01K 63/02 119/203 |
| 6,428,612 B1 * | 8/2002 | McPhilmy | ............. | B01D 53/02 |
| 6,602,466 B2 * | 8/2003 | Hamilton et al. | ............... | 422/37 |
| 7,051,648 B2 * | 5/2006 | Fenaroli | ................. | A47G 19/16 426/77 |
| 7,189,330 B2 * | 3/2007 | Hayashi et al. | ............. | 210/757 |
| 7,560,091 B2 * | 7/2009 | Hayashi et al. | ............. | 423/657 |
| 7,686,513 B2 * | 3/2010 | Knoerzer et al. | ............ | 383/111 |
| 7,922,984 B2 * | 4/2011 | Hamilton et al. | ............. | 422/305 |
| 8,574,503 B2 * | 11/2013 | Satoh et al. | ................... | 422/162 |
| 2005/0121399 A1 * | 6/2005 | Hayashi et al. | ............. | 210/749 |
| 2009/0229594 A1 * | 9/2009 | Usui | ....................... | A47J 36/28 126/263.08 |
| 2010/0147282 A1 * | 6/2010 | Urume | .................... | A47J 36/28 126/263.05 |
| 2012/0087990 A1 * | 4/2012 | Shiga | ........................... | 424/600 |
| 2012/0263629 A1 * | 10/2012 | Satoh et al. | .................. | 422/162 |
| 2013/0108515 A1 * | 5/2013 | Satoh | ........................ | C01B 3/08 422/162 |
| 2016/0207765 A1 * | 7/2016 | Takehara | .................. | C01B 3/08 |
| 2016/0249725 A1 * | 9/2016 | Hasegawa | ............... | A45D 34/00 222/96 |

FOREIGN PATENT DOCUMENTS

| | | | | |
|---|---|---|---|---|
| JP | 2001-219977 A | | 8/2001 | |
| JP | 2004174301 A | * | 6/2004 | ............... C02F 1/68 |
| JP | 2004243151 A | * | 9/2004 | ............... C02F 1/68 |
| JP | 2004-344783 A | | 12/2004 | |
| JP | 2005013925 A | * | 1/2005 | ............... C02F 1/68 |
| JP | 2009-154932 A | | 7/2009 | |
| JP | 3164934 U | | 12/2010 | |
| JP | 2011-105317 A | | 6/2011 | |
| JP | 2013082585 A | * | 5/2013 | |
| JP | 2014015224 A | * | 1/2014 | |

OTHER PUBLICATIONS

Machine translation of the description of JP 61021782 A.*
Office Action Chinese Patent Application No. 201310278630.0, dated Aug. 17, 2016.
Office Action Taiwanese Application No. 102115456, dated Aug. 18, 2016.

* cited by examiner

SEALING BAG FOR HYDROGEN GAS, AND METHOD FOR DISSOLVING HYDROGEN GAS

BACKGROUND OF THE INVENTION

1. Field of the Invention

The present invention relates to a technique to fill a liquid such as beverages and skin lotions with hydrogen gas.

2. Description of the Related Art

In recent years, soft drinks and the like formed by filling beverages such as water and teas with hydrogen gas are sold. These aim at reducing active oxygen that is present in a human body by ingesting hydrogen gas filled in a liquid.

It has been clarified that active oxygen is essential for life maintenance, for example, active oxygen plays an important role when it makes ATP (adenosine troposphere) in the citric acid cycle, and active oxygen also assumes a role to eject foreign substances that enter into the body. However, on the other hand, excess active oxygen that has not been used in a reaction in a living body is generally decomposed by an enzyme present in cells, but the excess active oxygen that has not been decomposed damages the cells. As a result, active oxygen causes diseases such as cancers and lifestyle-related diseases, aging and the like. Therefore, it is considered that it is beneficial to health to eject excess active oxygen.

Furthermore, the reasons why hydrogen gas is used for reducing active oxygen are that hydrogen has an extremely small molecular weight and thus is readily absorbed by the body, and that hydrogen is highly safe since only water is generated if hydrogen reacts with active oxygen, and the like.

As mentioned above, the pathological effectiveness of hydrogen water which is considered to have no special harmfulness and lead to prophylaxis of illness and health enhancement was reported in many academic journals and the like such as Non Patent Literatures 1 to 10, and is too numerous to comprehensively list here.

As mentioned above, ingestion of hydrogen gas exerts useful effects such as prophylaxis of illness and health enhancement, whereas it is difficult to dissolve hydrogen gas in a liquid and maintain the dissolved hydrogen therein at a high amount. For example, in the case when water filled with hydrogen gas is stored in a plastic container such as a PET (polyethylene telephthalate) bottle, most of the hydrogen escapes within several days even under a sealed state, and a high efficacy cannot be obtained even when this water is ingested.

In this regard, Patent Literature 1 suggests a method for maintaining the amount of dissolved hydrogen by enclosing a liquid in which hydrogen molecules are dissolved in a liquid container having a flexible exterior material, attaching a pressurizing element to a part or the entirety of the liquid container, and maintaining a state in which the container is pressurized from outside.

CITATION LIST

Non Patent Literatures

Non Patent Literature 1: Nature Medicine, 2007, Vol. 13, p. 688 to 694

Non Patent Literature 2: Biochem. Biophys. Res. Comm., 411 (2011), 143-149, T. Itoh et al. (Gifu International Institute of Biotechnology, Kinki University, Chubu University, Nagoya University et al.)

Non Patent Literature 3: Nutrition Research, 28 (2008) p. 137 to 143, Shizuo Kajiyama et al. (Kajiyama Internal Medicine Clinic, Kyoto Prefectural University of Medicine et al.)

Non Patent Literature 4: BJ. Heart and Lung Transplantation, Atsunori Nakao et al. (University of Pittsburgh, Cleveland Clinic et al.)

Non Patent Literature 5: Anti-Aging Medicine—The Journal of Japanese Society of Anti-Aging Medicine, Vol. 4, No. 1, p. 117-122, Katsuhiro Koyama et al. (University of Yamanashi, Faculty of Education Human Sciences and Faculty of Medicine, Graduate School of Medical Science, and Matsushita Electric Works Ltd., Home Appliances R&D Center)

Non Patent Literature 6: Exp. Oncology, 2009, 31, p. 156-162, Y. Saito, Prefectural University of Hiroshima Non Patent Literature 7: Experimental Medicine, Vol. 26, No. 13 (August), p. 2074 to 2080, 2008, Shigeo Ota, Ikuro Osawa et al. (Nippon Medical School)

Non Patent Literature 8: Investigative Ophthalmology & Visual Sci. 2010, 51, p. 487 to 492, Hideaki Oharazawa et al. (Nippon Medical School)

Non Patent Literature 9: Science, New Series, 190, 4210 (Oct. 10, 1975), p. 152 to 154. M. Dole (Baylor University, USA)

Non Patent Literature 10: Life Sci. 324 (2001) p. 729 to 714, B. Ghrib et al. (University of the Mediterranee, France)

PATENT LITERATURES

Patent Literature 1: Japanese Patent Application Laid-Open (JP-A) No. 2011-136727

SUMMARY OF THE INVENTION

The technique described in the above-mentioned Patent Literature 1 aims at maintaining the amount of the dissolved hydrogen in the liquid at a high state by applying a pressure in advance from outside to the container containing the liquid in which hydrogen is dissolved, with focusing on a proportional relationship between the solubility and pressure of gas (Henry's law).

However, in the case when this method is adopted, a mechanism to apply a pressure in advance to the container is required. Furthermore, the material for this container must be a material that can tolerate this pressure, and it is necessary that the material is a flexible material that can convert the pressure from outside to an internal pressure. In addition, if the container in which the liquid is contained itself does not have high sealing property or has low gas permeability, it is likely that the hydrogen gas in the liquid is conversely leaked or permeated to outside by an external pressure.

Therefore, the present invention aims at dissolving hydrogen gas in a liquid and maintaining the solubility of the hydrogen gas in the liquid at a high state.

In order to attain the above-mentioned object, the sealing bag for hydrogen gas according to one aspect of the present invention is a sealing bag that is configured to dissolve hydrogen gas in a liquid by being put into the liquid, including a hydrogen permeable film that can permeate hydrogen gas that is sealed and filled in the sealing bag to outside.

In the present invention, the liquid in which hydrogen gas is to be dissolved is not specifically limited, and various liquids including beverages such as water and teas, seasonings such as soy sauce and sauce, skin lotions and the like can be used.

Furthermore, the sealing bag including the hydrogen permeable film may be partially coated with a hydrogen non-permeable film having a relatively lower permeability to hydrogen gas than that of the hydrogen permeable film.

Alternatively, the sealing bag including the hydrogen permeable film may be wholly coated with the hydrogen non-permeable film, a permeation pore for permeating the hydrogen gas in the sealing bag to outside through the hydrogen permeable film may be formed on the hydrogen non-permeable film, and an operable and closable lid may be attached to the permeation pore.

Furthermore, a method for dissolving hydrogen gas according to another aspect of the present invention is a method for dissolving hydrogen gas in a liquid, including sinking into the liquid in advance a sealing bag including a hydrogen permeable film that can permeate hydrogen gas that is sealed and filled in the sealing bag to outside.

According to the present invention, hydrogen gas can be dissolved in a liquid and the solubility of the hydrogen gas in the liquid can be maintained at a high state by only putting a sealing bag including a hydrogen permeable film in which hydrogen gas is filled into the liquid and sinking the sealing bag into the liquid in advance.

DETAILED DESCRIPTION OF EMBODIMENTS

Example 1

Figure 1:
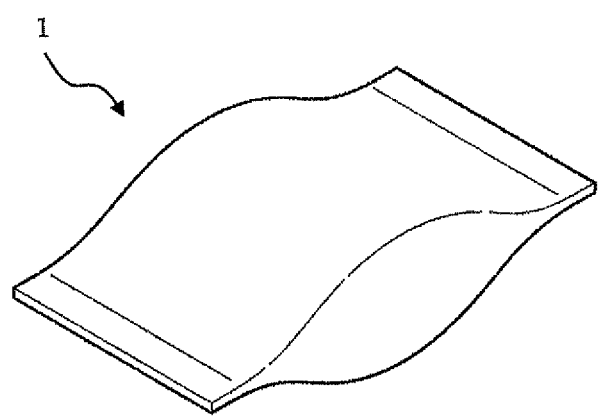
FIG. 1 is a perspective view showing a sealing bag according to a first embodiment of the present invention.

Next, the sealing bags according to the embodiments of the present invention will be explained with referring to the drawings.

Figure 2:
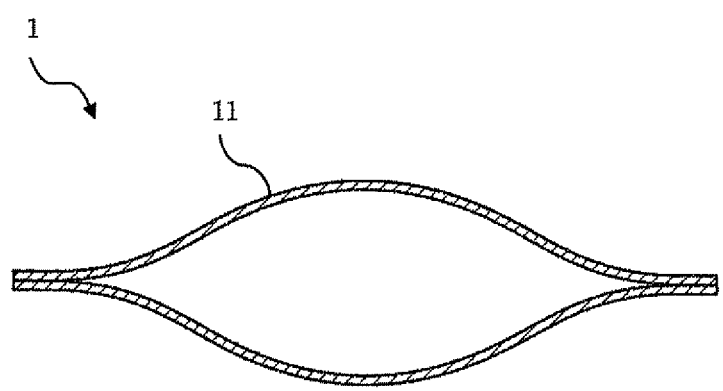
FIG. 2 is a cross-sectional view showing the structure of the sealing bag according to the present embodiment.

As shown in FIG. 1 and FIG. 2, a sealing bag 1 of the present embodiment is configured to have a bag-like form in which hydrogen gas ($H_2$ molecules) can be sealed and filled.

This sealing bag 1 is formed of a permeable film 11 of a resin, a rubber or the like through which hydrogen gas can be permeated. Examples of the permeable film 11 include a silicone rubber, SBR (styrene-butadiene rubber), EPDM (ethylene-propylene rubber), PE (polyethylene), PET (polyethylene telephthalate), LDPE (low density polyethylene), PP (polypropylene), nylon and the like.

Such sealing bag 1 is formed by, for example, laminating the both ends of a tube-like film having opened two ends to form a bag-like form, and the sealing bag 1 in which hydrogen gas is sealed and filled is prepared by filling hydrogen gas in advance before conducting lamination to put the sealing bag into a sealed state.

Figure 3:
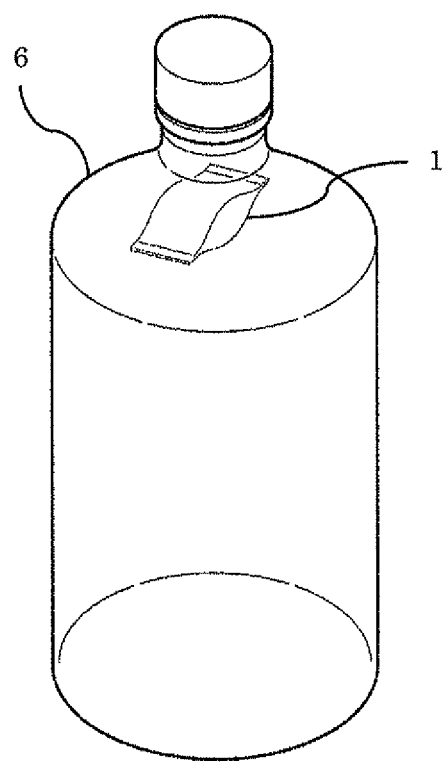
FIG. 3 is a schematic view showing the state of use of the sealing bag according to the present embodiment.

As shown in FIG. 3, the sealing bag 1 is used by sinking the sealing bag into a liquid.

In the example of FIG. 3, a liquid such as water is put into a container 6 such as a PET bottle, and the sealing bag 1 put into the container 6 is sunk into this liquid.

The hydrogen gas in the sealing bag 1 sunk into the liquid is permeated through the permeable film 11 and dissolved in the liquid. By this way, the hydrogen gas is dissolved in the liquid.

Furthermore, the hydrogen gas is permeated through the permeable film 11 little by little and is gradually dissolved in the liquid. As a result, even when the hydrogen gas that has dissolved once in the liquid is leaked or permeated to outside of the container 6, the hydrogen gas is constantly fed from the sealing bag 1 to the liquid, and thus the solubility of the hydrogen gas in the liquid can be maintained at a high state for a long period. Specifically, when one drinks a beverage as the liquid, hydrogen can be ingested into the body at a very high concentration by shaking the container in a state that the sealing bag 1 is sinking in the liquid.

Furthermore, a desired amount of hydrogen gas can be fed to the liquid in accordance with the size of the sealing bag 1 itself, or the amount of the hydrogen gas to be filled in the sealing bag 1.

Example 2

Figure 4:
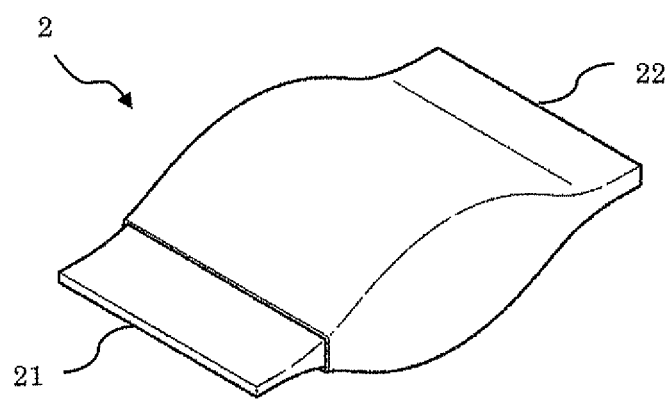
FIG. 4 is a perspective view showing a sealing bag according to a second embodiment of the present invention.
Figure 5:
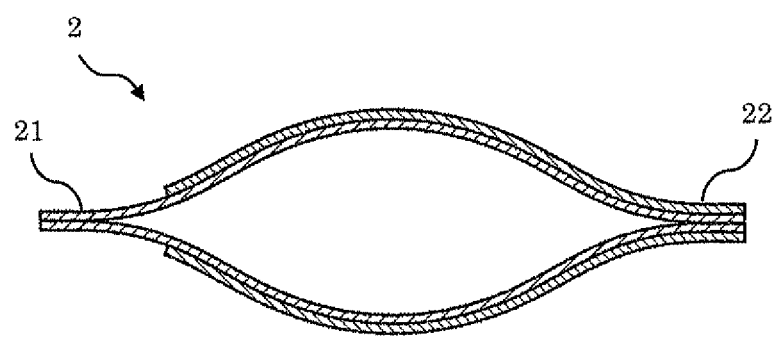
FIG. 5 is a cross-sectional view showing the structure of the sealing bag according to the present embodiment.

Next, a sealing bag 2 according to a second embodiment of the present invention is shown in FIG. 4 and FIG. 5.

The sealing bag 2 according to this embodiment is configured to have a bag-like shape in which hydrogen gas can be filled inside as in the sealing bag 1 of the first embodiment, whereas the sealing bag 2 includes two kinds of films: a permeable film 21 and a non-permeable film 22.

The permeable film 21 is formed of a rubber or synthetic resin material that is configured to have a bag-like shape as in the first embodiment, and hydrogen gas can be sealably filled in the permeable film and permeated to outside through the permeable film.

The outside of the permeable film 21 is partially coated with the non-permeable film 22.

This non-permeable film is a film that does not permeate hydrogen gas or has low permeability to hydrogen gas, or has relatively lower permeability to hydrogen gas than at least that of the permeable film 21. Specific examples include laminated films including an aluminum foil, an aluminum-deposited film, an aluminum oxide-deposited film or a silica-deposited film, and the like.

Since the bag-like permeable film 21 is partially coated with the non-permeable film 22, hydrogen gas is not permeated or is difficult to be permeated at the portion coated with the non-permeable film 22.

On the other hand, the hydrogen gas filled in the permeable film 21 is permeated to outside from the part at which the permeable film 21 is exposed without being coated with the non-permeable film 22.

When this bag filled with hydrogen gas is put into a liquid, the hydrogen gas is permeated from inside to outside from only the permeation part at which the permeable film 21 is exposed. Therefore, the amount or speed of permeation of the hydrogen gas to the liquid can be adjusted.

Example 3

Figure 6:
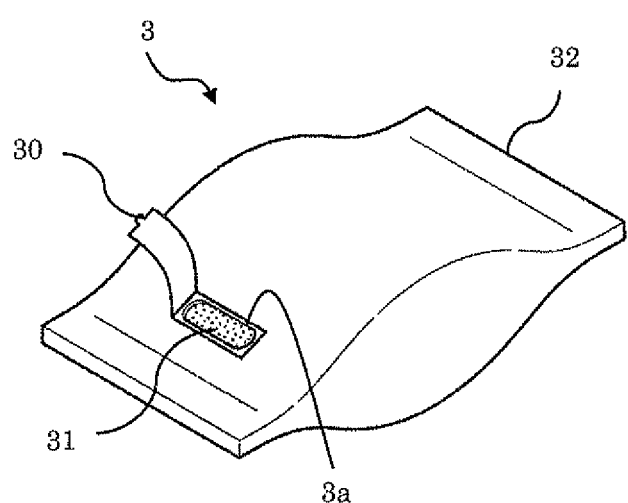
FIG. 6 is a perspective view showing a sealing bag according to a third embodiment of the present invention.
Figure 7:
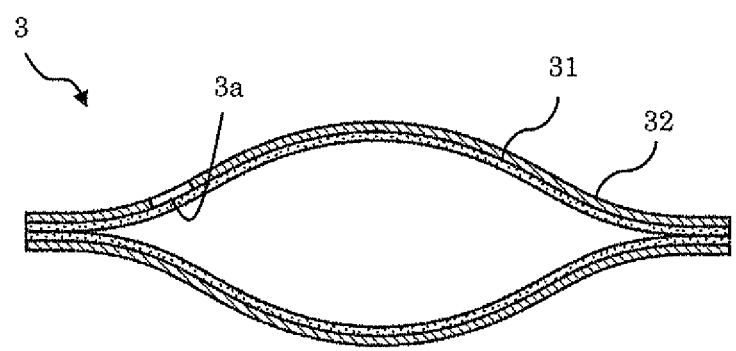
FIG. 7 is a cross-sectional view showing the structure of the sealing bag according to the present embodiment.

Next, a sealing bag 3 according to a third embodiment of the present invention is shown in FIG. 6 and FIG. 7.

The sealing bag 3 according to this embodiment is constituted by a permeable film 31 through which hydrogen gas can be permeated, and a non-permeable film 32 through which hydrogen gas is difficult to be permeated or not permeated as in the sealing bag 2 according to the second embodiment. On the other hand, the entirety of the permeable film 31 is coated with the non-permeable film 32, and a permeation pore 3a to expose the permeable film 31 inside and permeate the hydrogen gas from inside to outside through the exposed permeable film 31 is formed on a part of the non-permeable film 32.

A lid 30 that is openably and closably bonded to the surface of the non-permeable film 32 on the peripheral edge of the permeation pore 3a is attached to the vicinity of the permeation pore 3a. This lid 30 is also formed of a similar hydrogen gas non-permeable film to that in the non-permeable film 32.

Furthermore, an adhesive is applied to the inside of the lid 30 in this example, thereby the lid 30 is constituted as a seal that can be bonded to the surface of the non-permeable film 32 to occlude the permeation pore 3a or peeled off from the surface of the non-permeable film 32 to open the permeation pore 3a.

Since the lid 30 is formed, for example, it is possible to prevent permeation of the hydrogen gas to outside by closing the lid 30 until the sealing bag 3 is used, and to permeate the hydrogen gas to outside by opening the lid 30 in actual use. Therefore, unnecessary permeation of the hydrogen gas inside to outside during the storage of the sealing bag 3, or the like can be prevented.

Furthermore, the amount of the hydrogen gas that is permeated through the permeation film 31 can be controlled by adjusting the amount of opening or closing of the lid 30.

Although the lid 30 is constituted as an openable and closable seal in this embodiment, the lid 30 is not limited to this and can be configured to have a structure in which the lid 30 is integrally configured with the non-permeable film 32 to occlude the permeation pore 3a and the permeation pore 3a is exposed by cutting off the lid 30.

Figure 8:
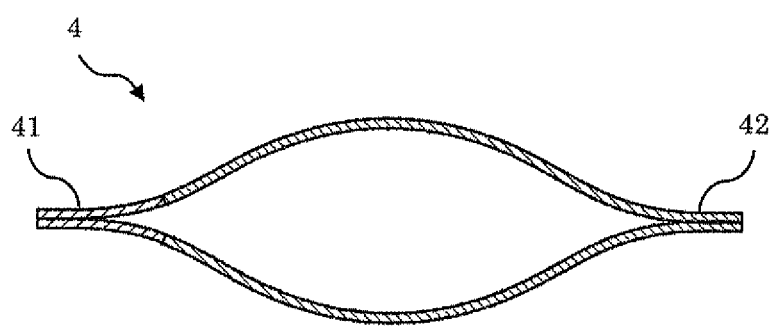
FIG. 8 is a cross-sectional view showing the structure of a sealing bag according to another embodiment of the present invention.

The above-mentioned sealing bag 2 according to the second embodiment of the present invention has a structure in which the bag-like permeable film 21 is partially coated with the non-permeable film 22. However, in this regard, in another embodiment, the sealing bag 2 may be constituted as a sealing bag 4 in which the openings of a bag-like permeable film 41 having an opened end and a bag-like permeable film 42 having an opened end are joined to each other, as shown in FIG. 8.

Figure 9:
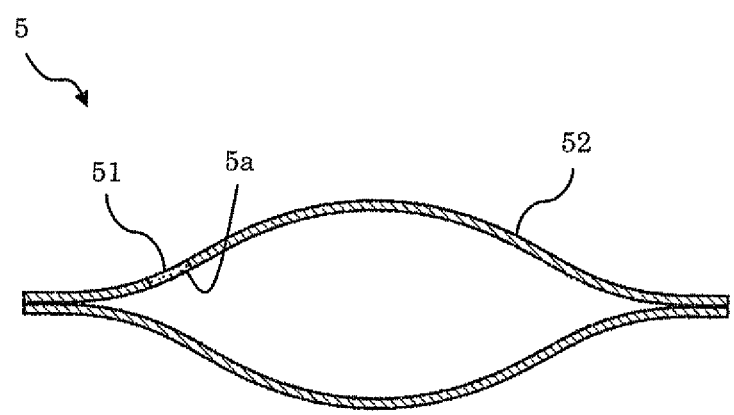
FIG. 9 is a cross-sectional view showing the structure of a sealing bag according to still another embodiment of the present invention.

Similarly, the above-mentioned sealing bag 3 according to the third embodiment of the present invention has a structure in which the entirety of the bag-like permeable film 31 is coated with the non-permeable film 32. However, in this regard, in another embodiment, only a permeation pore 5a formed on a bag-like non-permeable film 52 may be occluded by a permeable film 51 and the permeation pore 51a may be constituted openably and closably by a lid as shown in FIG. 9.

Furthermore, the permeable films 21 and 31 are partially or wholly coated with the non-permeable films 22 and 32, respectively in the sealing bags 2 and 3 according to the above-mentioned second and third embodiments of the present invention. However, the coating with the non-permeable films 22 and 32 may be conducted by depositing a hydrogen gas non-permeable material such as aluminum or the like.

Furthermore, the sealing bags 1, 2 and 3 in the above-mentioned embodiments each has a structure that is used by being put into a container containing a liquid such as a PET bottle and a pouch made of a resin. However, the sealing bags can be integrally attached to a container at the inner wall of the container or the like, or can constitute a part of the inner wall of the container.

The sealing bags for hydrogen gas explained as above can be used not only by being put into bottles such as PET bottles in which a beverage is enclosed, but also by being put into bags or containers for enclosing foods including canned foods, confectioneries such as potato chips, retort foods, seasonings such as soy sauce, and the like, medicaments such as infusions and eye drops, cosmetic goods such as skin lotions, and the like. By applying the present invention in such situations, the freshness of foods and the like can be maintained, the denaturation of medicaments and cosmetic goods can be prevented, and the effectiveness of medicaments and cosmetic goods is also enhanced.

REFERENCE SIGNS LIST

1 Sealing bag
11 Permeable film
12 Non-permeable film
2 Sealing bag
21 Permeable film
22 Non-permeable film
3 Sealing bag
3a Permeation pore
30 Seal lid
31 Permeable film
32 Non-permeable film
4 Sealing bag
41 Permeable film
42 Non-permeable film
5 Sealing bag
5a Permeation pore
51 Permeable film
52 Non-permeable film
6 Container

What is claimed is:

1. A sealing bag for permeating hydrogen gas comprising:
a hydrogen permeable film in a bag-like form to permeate hydrogen gas; and
a hydrogen non-permeable film partially covering the hydrogen permeable film,
wherein the sealing bag, comprising the hydrogen permeable film which is partially covered with the hydrogen non-permeable film, is filled with hydrogen gas and sealed, and the sealing bag, when provided into a liquid external to the sealing bag, is configured to dissolve the hydrogen gas into the liquid,
wherein the bag-like form has the hydrogen permeable film at opposite sides of the bag, while the hydrogen permeable film is partially covered by the hydrogen non-permeable film.

2. The sealing bag for hydrogen gas according to claim 1, wherein the hydrogen non-permeable film does not permeate hydrogen gas or has a relatively lower permeability to hydrogen gas than that of the hydrogen permeable film.

3. The sealing bag for hydrogen gas according to claim 1 or 2, wherein
the sealing bag comprising the hydrogen permeable film is coated with the hydrogen non-permeable film except at a permeation pore,
the permeation pore formed on the hydrogen permeable film is configured to permeate the hydrogen gas in the sealing bag to outside through the hydrogen permeable film, and
an openable and closable lid is attached to the permeation pore.

4. The sealing bag according to claim 1, wherein the hydrogen permeable film comprises a silicone rubber, SBR (styrene-butadiene rubber), EPDM (ethylene-propylene rubber), PE (polyethylene), PET (polyethylene telephtalate), LDPE (low density polyethylene), PP (polypropylene), or nylon; and the hydrogen non-permeable film comprises aluminum foil, aluminum deposited film, aluminum oxide-deposited film or a silica-deposited film.

5. A sealing bag for permeating hydrogen gas comprising:
a hydrogen permeable film in a bag-like form to permeate hydrogen gas; and
a hydrogen non-permeable film covering the hydrogen permeable film,
wherein the sealing bag, comprising the hydrogen permeable film which is covered with the hydrogen non-permeable film, is filled with hydrogen gas and sealed, and the sealing bag, when provided into a liquid external to the sealing bag, is configured to dissolve the hydrogen gas into the liquid, and
wherein the bag-like form has the hydrogen permeable film at opposite sides of the bag, while the hydrogen permeable film is covered by the hydrogen non-permeable film.

6. The sealing bag for hydrogen gas according to claim 5, wherein the hydrogen non-permeable film does not permeate hydrogen gas or has a relatively lower permeability to hydrogen gas than that of the hydrogen permeable film.

7. The sealing bag for hydrogen gas according to claim 5, wherein
the sealing bag comprising the hydrogen permeable film is coated with the hydrogen non-permeable film except at a permeation pore,
the permeation pore formed on the hydrogen permeable film is configured to permeate the hydrogen gas in the sealing bag to outside through the hydrogen permeable film, and
an openable and closable lid is attached to the permeation pore.

8. The sealing bag according to claim 5, wherein the hydrogen permeable film comprises a silicone rubber, SBR (styrene-butadiene rubber), EPDM (ethylene-propylene rubber), PE (polyethylene), PET (polyethylene telephtalate), LDPE (low density polyethylene), PP (polypropylene), or nylon; and the hydrogen non-permeable film comprises aluminum foil, aluminum deposited film, aluminum oxide-deposited film or a silica-deposited film.

9. A sealing bag for permeating hydrogen gas comprising:
a hydrogen permeable film in a bag-like form to permeate hydrogen gas;
a hydrogen non-permeable film covering the hydrogen permeable film,
a permeation pore formed on the hydrogen non-permeable film to expose the hydrogen permeation film underneath; and
an openable and closable lid attached to the permeation pore to control the amount of the hydrogen gas permeated through the permeation pore,
wherein the sealing bag, comprising the hydrogen permeable film which is covered with the hydrogen non-permeable film, is filled with hydrogen gas and sealed, and the sealing bag, when provided into a liquid external to the sealing bag, is configured to dissolve the hydrogen gas into the liquid, and
wherein the bag-like form has the hydrogen permeable film at opposite sides of the bag, while the hydrogen permeable film is partially covered by the hydrogen non-permeable film.

10. The sealing bag for hydrogen gas according to claim 9 wherein the hydrogen non-permeable film does not permeate hydrogen gas or has a relatively lower permeability to hydrogen gas than that of the hydrogen permeable film.

11. The sealing bag according to claim 9, wherein the hydrogen permeable film comprises a silicone rubber, SBR (styrene-butadiene rubber), EPDM (ethylene-propylene rubber), PE (polyethylene), PET (polyethylene telephtalate), LDPE (low density polyethylene), PP (polypropylene), or nylon; and the hydrogen non-permeable film comprises aluminum foil, aluminum deposited film, aluminum oxide-deposited film or a silica-deposited film.

* * * * *